United States Patent
Szarvas (10) Patent No.: US 10,476,742 B1
(45) Date of Patent: Nov. 12, 2019

(54) CLASSIFICATION OF AUTO SCALING EVENTS IMPACTING COMPUTING RESOURCES

(71) Applicant: Amazon Technologies, Inc., Seattle, WA (US)

(72) Inventor: György István Szarvas, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 453 days.

(21) Appl. No.: 14/864,754

(22) Filed: Sep. 24, 2015

(51) Int. Cl.
*H04L 12/24* (2006.01)

(52) U.S. Cl.
CPC ...... *H04L 41/0869* (2013.01); *H04L 41/5054* (2013.01)

(58) Field of Classification Search
CPC ................ H04L 41/0869; H04L 41/5054
See application file for complete search history.

(56) References Cited

U.S. PATENT DOCUMENTS

| | | | | |
|---|---|---|---|---|
| 8,055,595 B1* | 11/2011 | Birch | ................ | G06N 99/005 706/12 |
| 2009/0234784 A1* | 9/2009 | Buriano | ............ | G06F 17/30035 706/12 |
| 2011/0022560 A1* | 1/2011 | Breiter | ................ | G06N 5/04 706/47 |
| 2014/0258222 A1* | 9/2014 | Guo | ............ | G06F 17/30174 707/610 |
| 2015/0215426 A1* | 7/2015 | Torii | ................ | H04L 67/32 709/201 |
| 2016/0057041 A1* | 2/2016 | Gupta | ............ | H04L 41/142 706/12 |
| 2016/0300156 A1* | 10/2016 | Bowers | ............ | G06N 99/005 |

* cited by examiner

*Primary Examiner* — Viet D Vu (74) *Attorney, Agent, or Firm* — Thorpe North & Western, LLP (57) ABSTRACT

A technology is described for classifying an auto scaling event. An example method may include capturing information related to a configuration event having an impact on a computing service resource group hosted in a service provider environment. Detecting an auto scaling event associated with the computing service resource group may result in programmatically instantiating or stopping a computing service resource, whereupon the information related to the configuration event may be retrieved and the information related to the configuration event may be input to a machine learning model configured to classify the auto scaling event as a valid auto scaling event or an invalid auto scaling event using the information related to the event.

20 Claims, 8 Drawing Sheets

CLASSIFICATION OF AUTO SCALING EVENTS IMPACTING COMPUTING RESOURCES

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing service resources hosted by the single physical computing machine. For example, one type of computing service resource may be a computing instance. Each computing instance hosted by a single physical computing machine using a hypervisor may be a guest machine acting as a distinct logical computing system that provides a customer with the perception that the customer is the sole operator and administrator of a given virtualized hardware computing resource.

Auto scaling within a computing service environment may programmatically instantiate or terminate computing service resources that are respectively added or removed from a computing service resource group. Auto scaling may be used to maintain the availability of computing service resources included in a computing service resource group, allowing a customer of a computing service provider to scale computing capacity up or down automatically in response to demand and according to conditions that the customer may define. When a condition defined by a customer is met (e.g., computing instances in a computing cluster have exceed 90% capacity), an auto scaling event may occur that programmatically increases a number of computing service resources during demand spikes to maintain performance, and programmatically decreases the number of computing service resources during computing capacity reductions to reduce costs.

DETAILED DESCRIPTION

A technology is described for classifying an auto scaling event associated with instantiating, scaling, modifying, or terminating a computing service resource included in a computing service resource group using machine learning to determine whether the auto scaling event was erroneously triggered or legitimately triggered. An auto scaling event may be, for example, an event in a service provider environment that launches upon the satisfaction of a condition defined as part of an auto scaling rule or parameter, or a computing service resource group state that may result in auto scaling being performed. For example, a customer may configure auto scaling for the customer's computing service resource group by defining one or more auto scaling event rules or triggers, that when activated, result in adding or removing computing service resources from the computing service resource group. Illustratively, a computing service resource may be a computing instance, virtualized networking device, data store, application service, or other computing service resource. Consequently, for example, a computing service resource group may be a group of computing instances, virtualized networking devices, data stores, application services, or other computing service resources. In some cases, an auto scaling event trigger may be activated erroneously due to an internal problem within the customer's computing resource group. Examples of an erroneous activation may include a misconfiguration of computing service resources, a programming error, etc., as opposed to a legitimate condition for which auto scaling may be intended (e.g., an increased or decreased user demand on a web application).

A determination of whether an auto scaling event may be the result of an erroneous or legitimate auto scaling trigger may be made using machine learning to classify the auto scaling event as erroneous or legitimate. In one example configuration, feature information related to changes made to a computing service resource group that may have an impact on the computing service resource group may be captured and stored as a configuration event when those changes occur. Changes that have an impact on a computing service resource group may include, for example, software updates, computing service resource reconfigurations, settings updates, or other changes that may materially affect the operation of the computing service resource group.

Upon detecting an auto scaling event associated with the computing service resource group, the feature information related to the configuration event may be retrieved and the feature information may be input to a machine learning model configured to classify the auto scaling event as a potentially valid auto scaling event or a potentially erroneous auto scaling event using the feature information related to the changes made to the computing service group. In the case that the auto scaling event may be classified as potentially erroneous, a notification may be sent to a customer that owns the computing service resource group, thereby enabling the customer to investigate the auto scaling event and take action, if needed.

In the past, auto scaling for a computing service resource group may have been configured to instantiate or terminate one or more computing service resources included in the computing service resource group in response to an auto scaling trigger without consideration to what might have led to triggering of the auto scaling. In the case that the auto scaling event may have been erroneous (e.g., an increase in processor utilization was due to a programming error), a customer may have been charged for unneeded computing service resources. As a result of the current technology, machine learning may be used to determine whether an auto scaling event may be erroneous, allowing a customer to be notified (e.g., prior to auto scaling being triggered or prior to modifying a computing service resource group) so that the customer can evaluate the auto scaling event and terminate the auto scaling action or rollback changes made to the customer's computing service resource group as a result of the auto scaling action.

Figure 1:
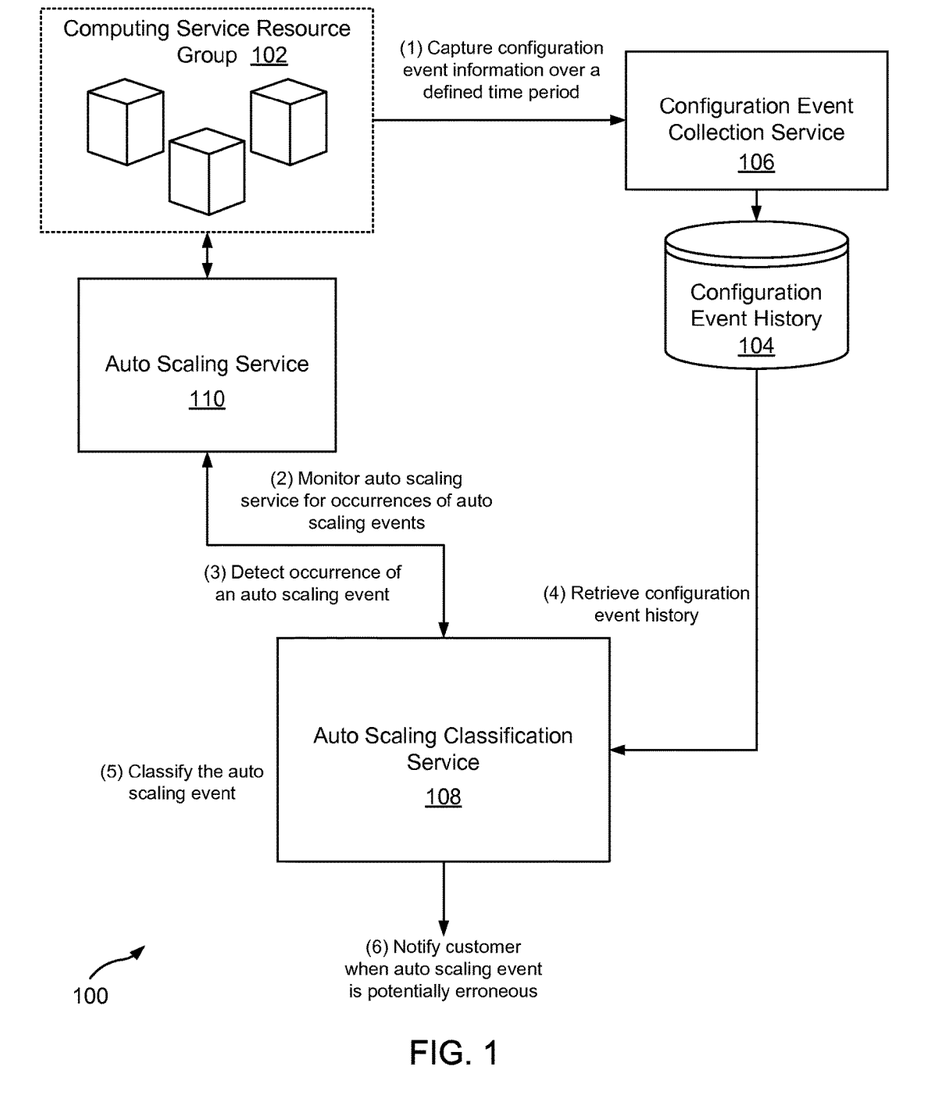
FIG. 1 is a block diagram illustrating an example system for classifying an auto scaling event as erroneously activated or legitimately activated.

FIG. 1 is a diagram illustrating a high level example of a system 100 and method that may be used to classify an auto scaling event as erroneously activated or legitimately activated. Illustratively, an auto scaling event may be an occurrence of programmatically instantiating or terminating a computing service resource and respectively adding or removing the computing service resource from a computing service resource group 102. An auto scaling event may be triggered as the result of satisfying an auto scaling rule during the execution of a computing service resource group 102.

A computing service resource group 102 may include any one of a number of computing service resources, such as computing instances, virtualized networking devices, data stores, and/or application services that may be increased or decreased in number using auto scaling. For example, a computing service resource group 102 may include a number of computing instances that execute a distributed application (e.g., a web application) that may be provided publicly to users. Utilization of the distributed application by the users may rise and fall over a time period, during which auto scaling may be used to instantiate and terminate computing instances as utilization of the distributed application respectively rises and falls. The computing service resource group 102 may be monitored using auto scaling rules that trigger an auto scaling event when conditions of the auto scaling rules are satisfied. For example, an auto scaling rule may be defined for processor utilization, such that as a demand on the application increases, processor utilization for the computing service resource group 102 may increase past a processor utilization threshold, triggering an auto scaling event, whereupon auto scaling may be used to instantiate a new computing instance and add the new computing instance to the computing service resource group 102.

As illustrated, the system 100 may include a configuration event collection service 106 and an auto scaling classification service 108. The configuration event collection service 106 may be configured to collect feature information related to changes made to a computing service resource group 102 and feature information related to a state of the computing service resource group 102. For example, configuration event collection service 106 may be used to: monitor a state of a computing service resource group 102, record changes to the state to the computing service resource group 102 and capture system metrics (e.g., processor metrics, memory metrics, throughput metrics, and the like) for the computing service resource group 102. Illustratively, changes made to the computing service resource group 102 may include: software updates, changes to application settings, reconfiguration of computing service resources, network topology changes, as well as other changes. In one example, any change to the state of the computing service resource group 102 may be captured and stored to a configuration event history 104. In another example, a change to the state of the computing service resource group 102 may be evaluated to determine whether the change may impact the performance of the computing service resource group 102. For example, some changes made to a computing service resource group 102, including software updates, may potentially have a material effect on the performance of the computing service resource group 102, such as when the software update includes a programming error (e.g., software bug) that causes one or more components of the computing service resource group 102 to become unstable. Consequently, changes that have been identified as potentially having an impact on the performance of the computing service resource group 102 may be captured and stored to the configuration event history 104. In contrast, some other changes may be ignored or discarded is immaterial to affecting auto scaling. One example, of a less important change may be the adding of a security user to a customer's computing service resource group 102.

In one example, the configuration event collection service 106 may be configured to monitor a computing service resource group 102 for the occurrence of configuration events that meet an event boundary condition. An event boundary condition, in one example, may be a condition that a configuration event has the potential to negatively affect the performance or stability of a computing service resource group 102. For example, a configuration event that updates software for a computing service resource group 102 may have a high potential to negatively affect the computing service resource group 102 due to potential programming errors that may be included in a software update. Whereas renaming a computing service resource group 102 may have a lower potential to negatively affect the performance or stability of the computing service resource group 102 due to a lack of codependency of the computing service resource group 102 name and the performance of computing service resources included in the computing service resource group 102.

Configuration events, in some examples, may be categorized as having a potential performance impact on a computing service resource group 102, ranked according to a potential performance impact on the computing service resource group 102, and/or weighted according to a potential performance impact on the computing service resource group 102. Based on a categorization, rank, and/or weighting, a determination may be made whether the configuration event meets the boundary condition. For example, in detecting a configuration event, a ranking may be assigned to the configuration event, and if the ranking meets or exceeds a boundary condition ranking, then feature information related to the condition event may be captured.

In one example, in response to detecting a configuration event that meets a boundary condition, a counter may be started for a time period (e.g., a number of hours, or a number of days) in which monitoring for an auto scaling event may be performed. In the case that an auto scaling event is detected during the time period, the auto scaling event may be classified using the configuration event as submitted to the auto scaling classification service 108. After the time period expires, classification of auto scaling events may be discontinued until a time that the time period is started again.

In another example, after detecting a configuration event that meets the boundary condition, a counter for a time period may be started during which monitoring for subsequent configuration events that meet the boundary condition may be performed. In the case that one or more subsequent configuration events are detected during the time period, monitoring for an auto scaling event may be performed. In the case that an auto scaling event is detected during the time period, the auto scaling event may be classified using the configuration events as submitted to the auto scaling classification service 108. In one example, monitoring for subsequent configuration events may be performed for configuration events that meet the same boundary condition as the configuration event that started the time period. In another example, subsequent configuration events that may be detected may meet different boundary conditions than that of the configuration event that started the time period. For example, a ranking for a first configuration event that starts a configuration event monitoring time period may be higher than a ranking for a second configuration event that starts monitoring for auto scaling events.

As indicated, the auto scaling classification service 108 may be used to detect the occurrence of an auto scaling event and to classify the auto scaling event as being erroneously triggered or legitimately triggered. In one example, the auto scaling classification service 108 may be configured to monitor the auto scaling service 110 for the occurrence of auto scaling events associated with the computing service resource group 102. In another example, as described earlier, the auto scaling classification service 108 may be configured to monitor the auto scaling service 110 for auto scaling events during a time period activated by the configuration event collection service 106 as a result of detecting a configuration event that meets a boundary condition.

In monitoring the auto scaling service 110, the auto scaling classification service 108 may be configured to detect an occurrence of an auto scaling event that may be initiated by the auto scaling service 110, which may monitor the computing service resource group 102 in order to determine whether an auto scaling rule has been triggered. When a determination is made that an auto scaling rule has been triggered, an auto scaling event may be initiated and the auto scaling service 110 may programmatically instantiate or stop one or more computing service resources included in the computing service resource group 102.

After detecting the occurrence of an auto scaling event, the auto scaling event may be classified using machine learning in the auto scaling classification service 108. Illustratively, supervised machine learning may be the application of externally supplied data to produce general hypotheses, which then make predictions about future data. In other words, the goal of supervised learning may be to build a model of the distribution of class labels in terms of predictor features. The resulting classifier may then used to assign class labels to the testing data where the values of the predictor features may be known, but the value of the class label may be unknown. Non-limiting examples of machine learning models that may be used to classify auto scaling events may include decision tree models, support-vector machines, naïve Bayes models, and random forest models.

In one example, a feature vector may be constructed using system metrics for the computing service resource group 102 at the time that the auto scaling event was triggered, historical system metrics, and feature information related to past configuration events obtained from the configuration event history 104. For example, feature information related to the most recent configuration event may be obtained from the configuration event history 104, or feature information related to a first configuration event that started a time period and subsequent configuration events, as described above, may be obtained from the configuration event history 104.

In some examples, when obtaining past configuration events from the configuration event history 104, a time boundary (e.g., a time between the present time and N number of days, hours or minutes ago) for analyzing configuration events that have had an impact on a computing service resource group 102 may be identified and past configuration events that were captured at a time that falls within the time boundary may be retrieved from the configuration event history 104. For example, recently occurring configuration events may provide more useful information in determining whether an auto scaling event may have been triggered erroneously as compared to configuration events that may have occurred farther in the past. For instance, information related to configuration events that have occurred within the past few hours or past few days may provide a better picture of the current state of a computing service resource group 102 as opposed to information related to configuration events that occurred more than a few days ago that may have become stale. For example, any problems associated with older configuration events may have already been discovered and corrected.

In another example, the auto scaling event may be analyzed to determine what condition of an auto scaling rule triggered the auto scaling event and computing service resource group information (trigger information) related to the trigger of the auto scaling event may be identified and may be included in a feature vector. For example, an auto scaling rule may be triggered when an average processor utilization rate stays above ninety percent for fifteen minutes. After the auto scaling rule is triggered, the auto scaling rule may be analyzed to identify the condition (processor utilization >90%) that triggered the auto scaling event and computing service resource group information (e.g., processor utilization, active application information, background application information, etc. for computing service resources included in the computing service resource group 102) may be identified and included in a feature vector. The computing service resource group information and information related to past configuration events obtained from the configuration event history 104 may be included in the feature vector. The information represented in the feature vector may be used by a machine learning model to classify the auto scaling event as being triggered erroneously or legitimately.

In one example, in constructing a feature vector that includes features for the computing service resource group 102 and features for configuration events, weightings may be applied to features that may have been determined to be better indicators of whether an auto scaling event may be erroneous as compared to other features included in the feature vector. As a specific example, a greater weighting may be applied to a feature representing a configuration event in which a software update was applied to a computing service resource group 102 as compared to a weighting applied to a feature representing a configuration event in which a reboot of a computing instance included in the computing service resource group 102 was performed.

After constructing a feature vector, the feature vector may be input to the machine learning model, which may be configured to use the information included in the feature vector to identify a pattern that correlates with a pattern indicating that the auto scaling event was erroneously triggered or a pattern indicating that the auto scaling event was legitimately triggered. The machine learning model may output a classification for the auto scaling event that indicates the potential legitimacy of the auto scaling event.

In one example, a classification indicating that an auto scaling event may have been erroneously triggered may be included in a notification that may be generated and sent to a customer that owns the computing service resource group 102, or be displayed in an auto scaling command console. In another example, the notification may be provided to the customer before auto scaling is triggered. For example, the auto scaling event may be an event that is likely to trigger auto scaling of the computing service resource group 102, such as in a case where the state of the computing service resource group 102 may be nearing a point that an auto scaling rule is likely to be triggered. In such a case, a notification may be sent to the customer informing the customer that the impending auto scaling may be invalid. In another example, the notification may be sent after auto scaling has been triggered but before a computing service resource has been launched or terminated. For example, the auto scaling event may be an event that results in triggering auto scaling of the computing service resource group 102 and the notification may be sent to the customer informing the customer that the auto scaling event may be erroneous. The customer may then determine whether the auto scaling event may be legitimate by investigating the cause of the auto scaling event (e.g., prior to auto scaling being triggered or prior to auto scaling modifying the customer's computing service resource group 102) and take action as needed, such as overriding auto scaling of any computing service resources and/or rolling back the state of the computing service resource group 102 to a previous state. In another example, auto scaling of one or more computing service resources in a computing service resource group 102 may be programmatically overridden (e.g., terminated) as the result of a classification that indicates that an auto scaling event may have been erroneously triggered. For example, instead of, or prior to notifying a customer that owns the computing service resource group 102, the auto scaling of any computing service resources may be terminated and, in some examples, the state of the computing service resource group 102 may be rolled back to a prior state.

Figure 2:
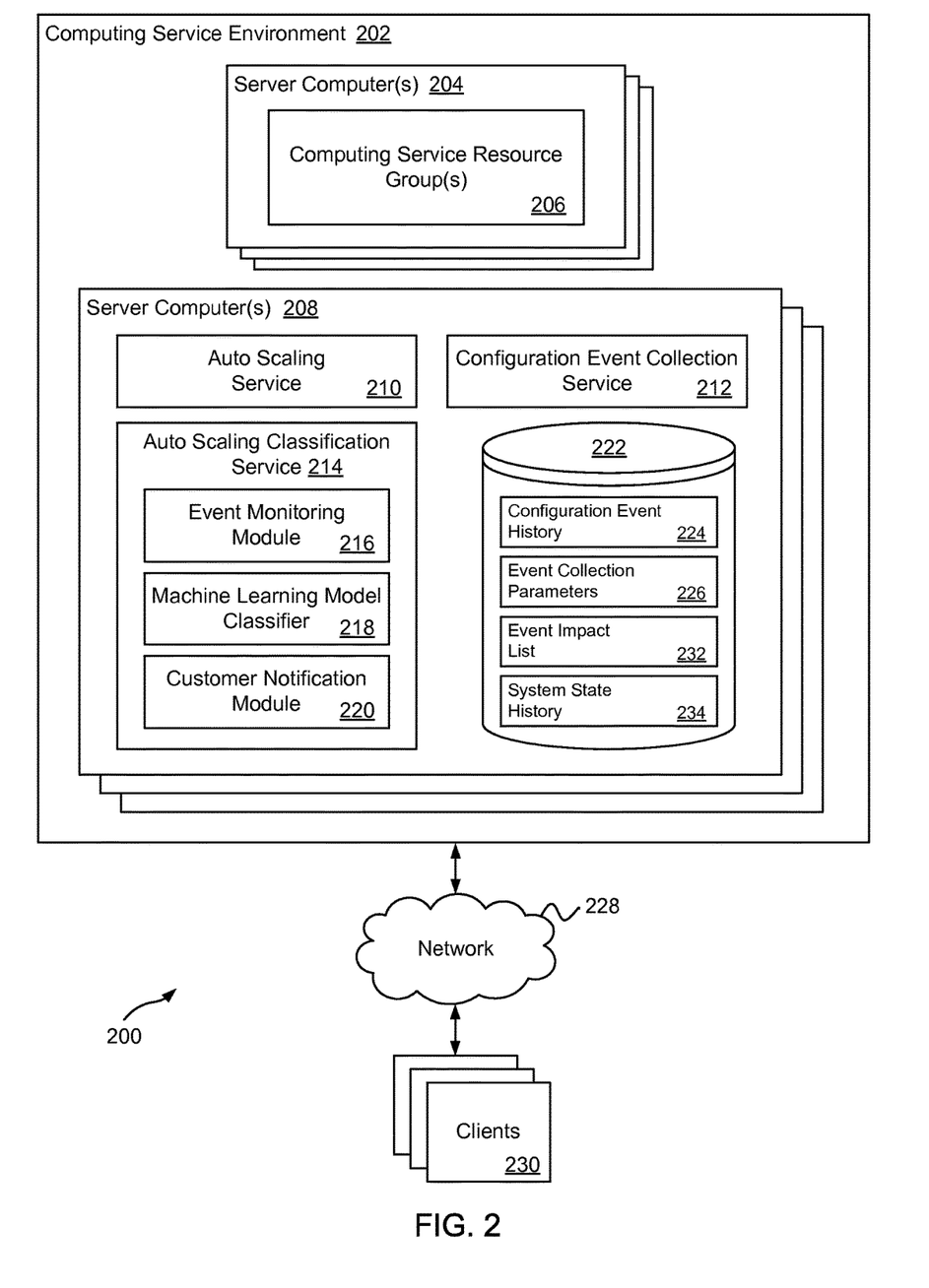
FIG. 2 is a block diagram that illustrates various example components included in a system for classifying auto scaling events associated with computing service resource groups.

FIG. 2 illustrates components of an example system 200 on which the present technology may be executed. The system 200 may include a computing service environment 202 that employs virtualization to allow a single physical server computer to host multiple computing instances (e.g., virtual guest machines) using a hypervisor or another virtualization scheme, where each computing instance may be a guest machine acting as a distinct logical computing system. The computing service resource group 206 may be owned by a customer of a computing service operator who may have access to the computing service resource group 206 using a client 230 via a network 228.

The computing service environment 202 may include server computers 204 that host a computing service resource group 206 that may include a number of computing service resources, such as computing instances, virtualized networking devices, data stores, and/or application services that may be increased or decreased in number using an auto scaling service 210. Also, the computing service environment 202 may include server computers 208 that host the auto scaling service 210, a configuration event collection service 212, and an auto scaling classification service 214.

In one example, the configuration event collection service 212 may be used to collect information related to changes that may be made to the computing service resource group 206 as described in relation to FIG. 1. For example, changes made to a configuration of the computing service resource group 206 (e.g., software updates, reconfiguration of computing service resources, settings updates, etc.) which may have an impact on the performance of the computing service resource group 206 and may lead to an auto scaling event being triggered, may be captured and stored to a configuration event history 224 stored in a data store 222. Also, system state information (metrics) for the computing service resource group 206 may be collected and stored in the data store 222 as system state history 234.

As described earlier, the configuration event collection service 212 may be configured to collect information related to configuration changes according to various examples. In one example, configuration events that modify the state of a computing service resource group 206 may be captured and stored to a configuration event history 224. For example, configuration events occurring over the past few hours, days, or weeks may be captured and stored to the configuration event history 224 and older or stale configuration events may be purged from the configuration event history 224. Illustratively, event collection parameters 226 that specify an amount of time to store configuration event information may be referenced by the configuration event collection service 212 and used to manage a configuration event history 224.

In another example, configuration events that have been identified as having the potential to impact the performance of a computing service resource group 206, resulting in an auto scaling event being triggered, may be captured. For instance, the configuration event collection service 212 may be configured to detect when a configuration change to a computing service resource group 206 is made and identify the configuration event as having the potential to impact the performance of a computing service resource group 206 by referencing an event impact list 232 that identifies configuration events that may be suspected or have been determined to impact the performance of a computing service resource group 206.

In yet another example, the configuration event collection service 212 may be configured to monitor a computing service resource group 206 for a configuration event that starts a counter for a time period during which monitoring may be performed for additional configuration events and/or auto scaling events as described in relation to FIG. 1. Illustratively, the event collection parameters 226 may include a time period parameter that may be referenced by the configuration event collection service 212 when setting or initiating the time period.

The auto scaling classification service 214 may be configured to classify auto scaling events performed by the auto scaling service 210 using machine learning. The auto scaling classification service 214 may include an event monitoring module 216, a machine learning model classifier 218, and a customer notification module 220. The event monitoring module 216 may be configured to monitor the auto scaling service 210 for occurrences of auto scaling events. Upon detecting an auto scaling event, the event monitoring module 216 may be configured to retrieve current computing service resource group 206 system state information (e.g., system metrics) for a computing service resource group 206 associated with the auto scaling event as well as system state history 234 for the computing service resource group 206 and to retrieve configuration event information from a configuration event history 224 associated with the computing service resource group 206. In one example, configuration event information retrieved from the configuration event history 224 may be for a defined time period (e.g., past few hours, days, week, or longer).

After retrieving the computing service resource group 206 system state information, system state history 234, and the configuration event information, then the event monitoring module 216 may be configured to construct a feature vector using the computing service resource group 206 system state information, system state history 234, and the configuration event information. As an illustration, the feature vector may include features representing various current and historical system metrics (processor, memory, input/output, throughput, etc.) and configuration events (software updates, reconfigurations of computing service resources, settings updates, etc.) that may be used by the machine learning model classifier 218 to construct a pattern that may correlate to a pattern indicating that the auto scaling event may have been erroneously triggered, or correlate to a pattern indicating that the auto scaling event may have been legitimately triggered.

The machine learning model classifier 218 may be constructed and trained to identify a pattern of events that have an impact on a computing service resource group 102 that result in an operational error that triggers an auto scaling event. In one example, the machine learning model classifier 218 may be trained using a configuration event history 224 for a customer's computing service resource group 206. In another example, the machine learning model classifier 218 may be trained to classify auto scaling events using a data set of public anonymized data that may be obtained from various customers of a computing service provider. In yet another example, the machine learning model classifier 218 may be trained using historical training data obtained from computing service resource configurations groups that are similar to a customer's computing service resource group 206 configuration. For example, computing service resource groups that are similar in configuration to the customer's computing service resource group 206 may be identified and configuration event information and expected outputs associated with the computing service resource groups may be obtained from a configuration event history 224.

In some examples, the machine learning model classifier 218 may be trained using supervised training, which may involve training the machine learning model classifier 218 to recognize a pattern of events that may indicate that an auto scaling event may be erroneous. As one example of supervised training that may be used, the machine learning model classifier 218 may be trained to identify a pattern of events associated with a customer overriding auto scaling of a computing service resource group 206. An assumption may be made that because the customer overrode the auto scaling, an internal error within the computing service resource group 206 caused the auto scaling event, rather than a legitimate scaling event. For example, information for configuration events that may have been subsequently followed by an auto scaling event that was interrupted by an owner of a computing service resource group 206, who then released computing service resources allocated by the auto scaling event, may be used to train the machine learning model classifier 218 because these configuration events may be highly indicative that the configuration events are associated with erroneous auto scaling events.

A feedback loop may be used to train the machine learning model classifier 218. In one example, an occurrence of a first configuration event may be identified that impacts a computing service resource group 206, such as a software update, settings update, or other configuration event. Thereafter, monitoring for an auto scaling event may be performed. In the case that an auto scaling event is detected, monitoring for a second configuration event associated with the auto scaling event may be performed. The second configuration event may indicate that the auto scaling event may be invalid. For example, a customer may rollback changes made as part of the first configuration event, or may make additional changes to the computing service resource group 206 associated with the first configuration event (e.g., patch a software update that was installed as part of the first configuration event). In the case that the second configuration event indicates that the auto scaling event may have been erroneous, feature information related to the first configuration event and the second configuration event may be obtained from the configuration event history 224 and the feature information may be used to train the machine learning model classifier 218.

As an illustration, a customer may update software for computing instances included in the customer's computing service resource group 206. The software update event may be captured and monitoring for an auto scaling event may be performed. Upon detecting an auto scaling event for the customer's computing service resource group 206, monitoring may be performed (e.g., during a time period) to determine whether the customer performs a subsequent configuration change (e.g., rolling back the software update) that may be related to the software update event and the auto scaling event. For example, the customer may terminate the auto scaling event, or restore the customer's computing service resource group 206 to a prior state that existed before the auto scaling event and rollback or patch the software update. Features of the customer's behavior and features of the configuration events and the customer's computing service resource group 206 may be used to train the machine learning model classifier 218 to identify auto scaling events associated with similar configuration events as potentially erroneous.

In another example, a customer may explicitly provide feedback that may be used to train the machine learning model classifier 218. For example, the auto scaling classification service 214 may fail to detect that an auto scaling event may be potentially erroneous and thus, a customer may not be provided notice that the auto scaling event may be erroneous. However, the customer may detect that the auto scaling event is invalid and may provide feedback to the auto scaling classification service 214 regarding the auto scaling event, which may then be used as part of a feedback loop used to train the machine learning model classifier 218.

In some examples, configuration events that were followed by an interruption of auto scaling may be ranked or weighted higher than other configuration events when used to train the machine learning model classifier 218. Further, a feedback loop may be used to train the machine learning model classifier 218 where the machine learning model classifier 218 may be trained to recognize configuration event patterns that are suspected to be associated with erroneous auto scaling events. For example, a feedback loop may be used to further train a machine learning model classifier 218 using information for configuration events that were followed by an owner of a computing service resource group 206 interrupting auto scaling of computing service resources included in the computing service resource group 206. Alternatively, an owner who takes no action after an auto scaling feature has been activated may indicate that the owner thought the classification was appropriate.

The customer notification module 220 may be configured to generate a notification that may be sent and/or displayed to a customer that owns a computing service resource group 206 informing the customer that an auto scaling event associated with the customer's computing service resource group may have been erroneously triggered. In receiving the notification, the customer may investigate the cause of the auto scaling event and take action if desired. Illustratively, the customer notification module 220 may be configured to display a notification in a user interface, such as an auto scaling command console, or send the notification using email, push message (e.g., Short Message Service (SMS), Multimedia Message Service (MMS)), voice message, or the like.

A customer may utilize a client 230 to access and configure the customer's computing service resource group 206 and to access the auto scaling service 210. A client 230 may comprise, for example a processor-based system such as a computing device. A client 230 may be a device such as, but not limited to, a desktop computer, laptop or notebook computer, tablet computer, mainframe computer system, handheld computer, workstation, network computer, or other devices with like capability.

The various processes and/or other functionality contained within the system 200 may be executed on one or more processors that are in communication with one or more memory modules. The system 200 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 228 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
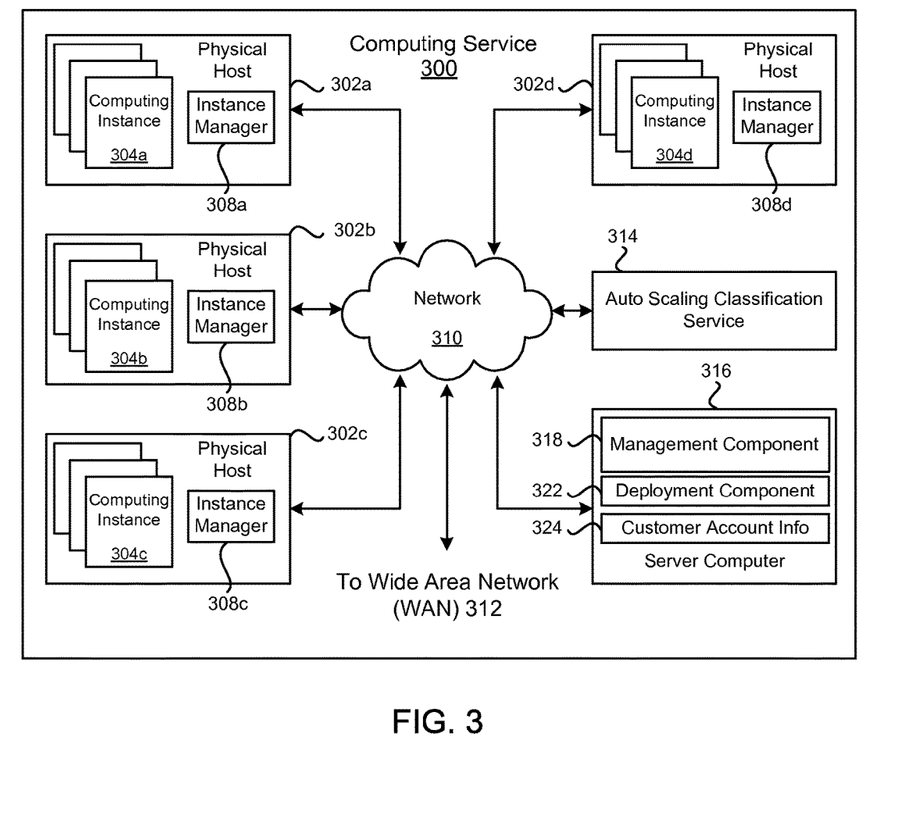
FIG. 3 is a block diagram that illustrates an example computing service environment that includes an auto scaling classification service.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for managing the operation of the computing service 300 and the computing instances 304a-d. For example, a server computer 314 may execute an auto scaling classification service configured to classify an auto scaling event as being potentially erroneously triggered or legitimately triggered using information related to configuration events associated with a computing instance 304a-d.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. The network topology illustrated in FIG. 3 has been simplified, many more networks and networking devices may be utilized to interconnect the various computing systems disclosed herein.

Figure 4:
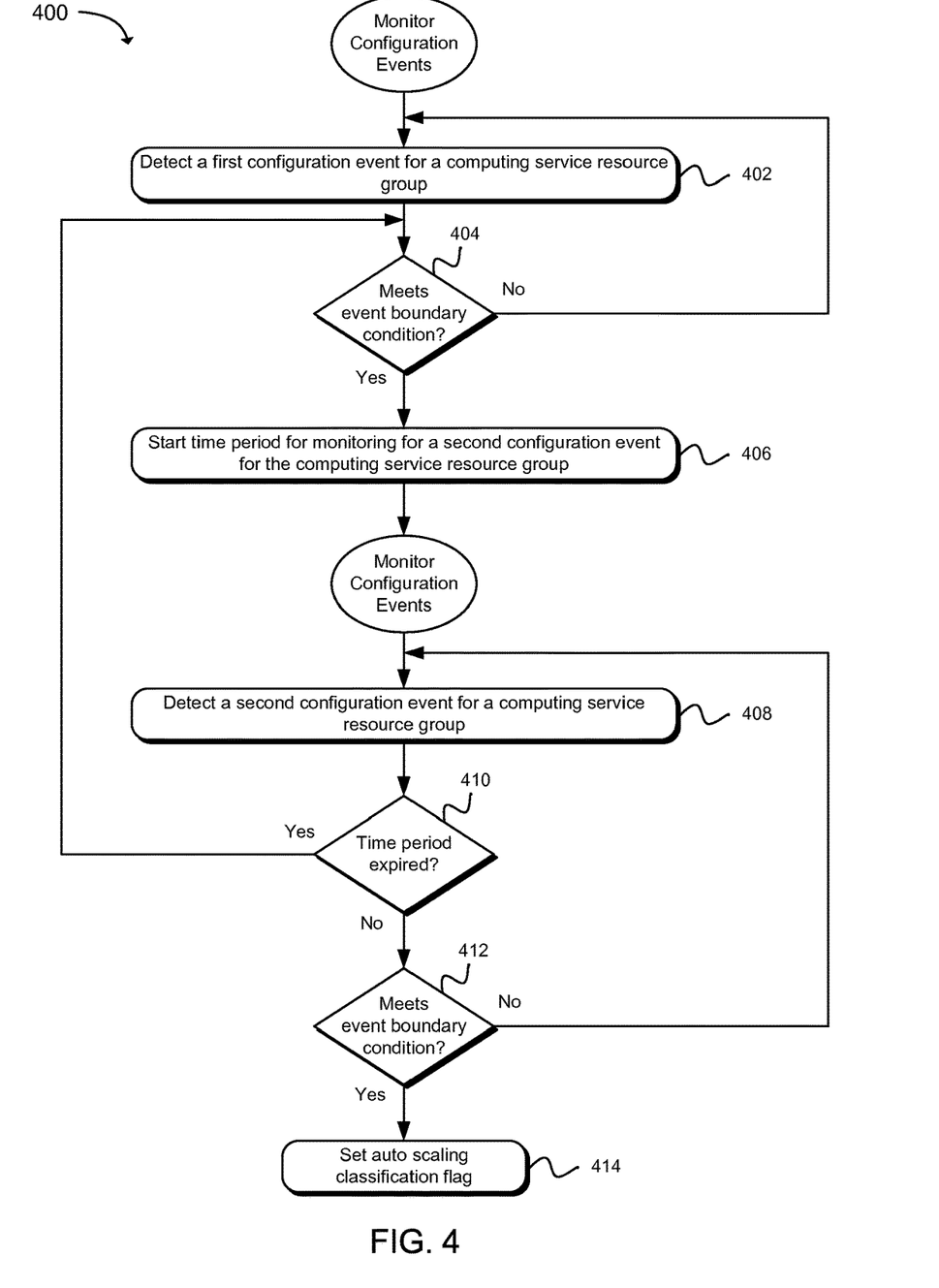
FIG. 4 is a flow diagram illustrating an example method for detecting configuration events that meet a boundary condition within a defined time period.

Moving now to FIG. 4, a flow diagram illustrates an example method 400 for detecting configuration events that meet a boundary condition within a defined time period. In one example, a configuration event collection service may be configured to monitor a computing service resource group for configuration changes (configuration events) made to the computing service resource group. For example, the configuration event collection service may monitor the state of a computing service resource group in order to detect configuration changes that may be made to the computing service resource group.

Starting in block 402, a first configuration event may be detected for the computing service resource group. The first configuration event may be a change that may have been made to the configuration of the computing service resource group. Illustratively, configuration events may include, but are not limited to, software updates, reconfigurations of computing service resources, settings updates, or other changes that may materially affect the operation of a computing service resource group.

As in block 404, a determination may be made whether the first configuration event meets an event boundary condition. In one example, an event boundary condition may be a condition that a configuration event may have the potential to negatively affect the performance or stability of a computing service resource group. For example, the configuration event may include a characteristic that may be associated with occurrences of performance problems and/or stability problems of computing service resource groups. Illustratively, characteristics of configuration events may be categorized, ranked, and or weighted as having a potential performance impact on a computing service resource group. Based on a categorization, rank, and/or weighting of a characteristic, a determination may be made whether a configuration event meets a boundary condition.

In the case that the first configuration event meets the event boundary condition, as in block 406, a time period may be started during which monitoring for subsequent configuration events may be performed (e.g., a second configuration event) that meets an event boundary condition. The time period may be for a number of minutes, hours, or days depending upon the configuration event detected. For example, the detection of a reconfiguration of a computing service resource included in the computing service resource group may result in a time period of a few hours, whereas the detection of a software update to the computing service resource group may result in a time period of several days.

A counter for the time period may be started during which monitoring for subsequent configuration events that meet the same boundary condition or a different boundary condition may be performed. For example, a first configuration event may be an application update associated with an update characteristic that results in starting the time period and the second configuration event may be a settings update associated with a settings change characteristic.

As in block 408, while monitoring for subsequent configuration events, if a second configuration event is detected, then as in block 410, a determination may be made whether the time period has expired. In the case that the time period has expired, then the second configuration event may be treated as a first configuration event and control may be passed to block 404. In the case that the time period has not expired, than as in block 412, a determination may be made whether the second event meets an event boundary condition.

In the case that the second event does not meet the event boundary condition, then monitoring for configuration events may be continued for the remaining time period (i.e., until the expiration of the time period). In the case that the second event meets the event boundary condition, then as in block 414, an auto scaling classification flag may be set. In one example, the auto scaling classification flag may signal to an auto scaling classification service that any auto scaling events detected in relation to the computing service resource group may be classified as described in relation to FIG. 5. Upon the expiration of the time period, the auto scaling classification flag may be unset.

Figure 5:
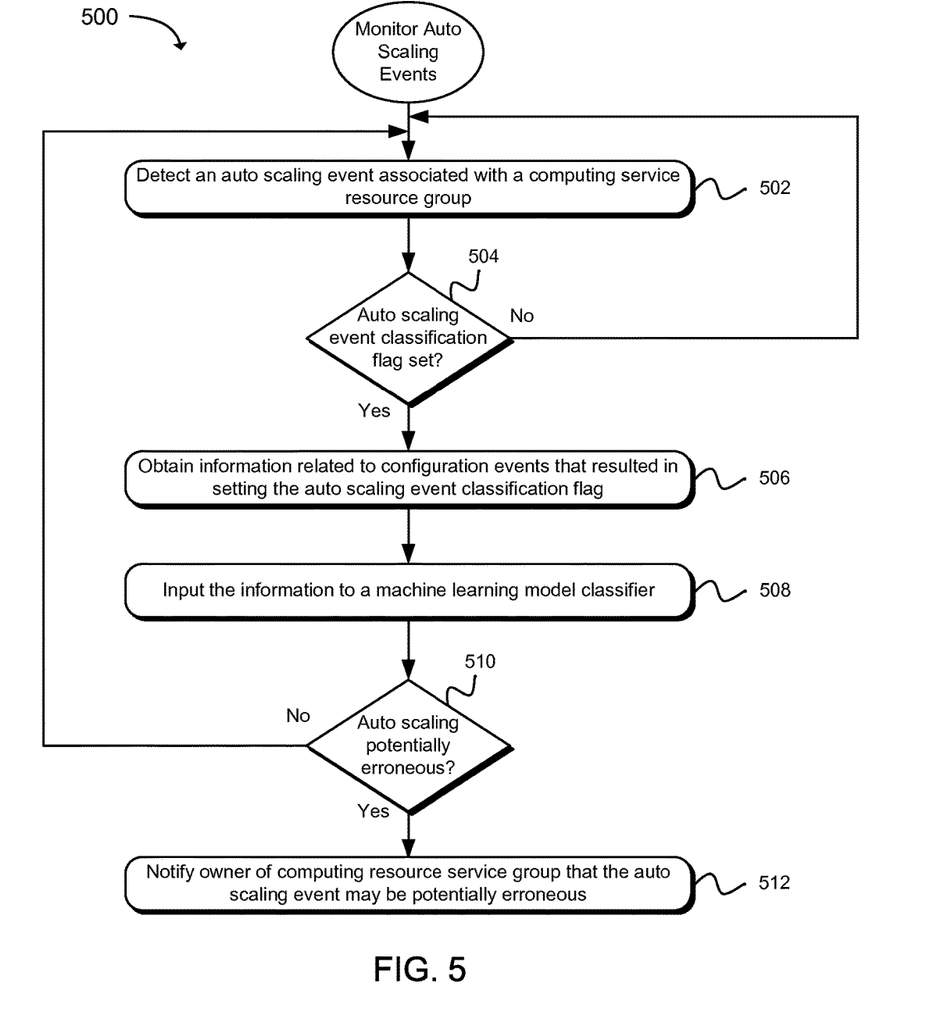
FIG. 5 is a flow diagram that illustrates an example method for classifying an auto scaling event associated with a computing service resource group using a machine learning classifier.

FIG. 5 is a flow diagram illustrating an example method 500 for classifying an auto scaling event associated with instantiating or terminating a computing service resource included in a computing service resource group using a machine learning classifier. In one example, an auto scaling classification service may be configured to monitor a computing service resource group for auto scaling events. More specifically, the auto scaling classification service may be configured to monitor an auto scaling service for auto scaling events that are associated with a particular computing service resource group.

Starting in block 502, an auto scaling event associated with a computing service resource group may be detected. After detecting the auto scaling event, as in block 504, a determination may be made whether an auto scaling event classification flag has been set, as described in relation to FIG. 4. In the case that the auto scaling event classification flag is not set, monitoring of the computing service resource group may be continued. In the case that the auto scaling event classification flag is set, then as in block 506, information related to the configuration events that resulted in the auto scaling event classification flag being set may be obtained. In one example, information related to the configuration events (e.g., a first configuration event and a second configuration event) may be retrieved and information related to the state of the computing service resource group at the time of the auto scaling event may be retrieved.

As in block 508, the information related to the configuration events may be input to a machine learning model classifier. For example, a feature vector that represents features of the configuration events and features of the state of the computing service resource group may be constructed using the information related to the configuration events and information related to the state of the computing service resource group and the feature vector may be input to the machine learning model classifier.

The machine learning model classifier may output a classification for the auto scaling event indicating that the auto scaling event may have been either erroneously triggered or legitimately triggered. As in block 510, in the case that a classification is output that indicates that the auto scaling event may have been erroneously triggered, then as in block 512, an owner of the computing service resource group may be notified that the auto scaling event may be erroneous, thereby enabling the owner to investigate the cause of the auto scaling event. In some examples, the information related to the configuration events that may have led to the auto scaling event and information related to the state of the computing service resource group at the time of the auto scaling event may be provided to the owner so that the owner may analyze the information. Returning to block 510, in the case that the classification output by the machine learning model classifier indicates that the auto scaling event may have been legitimately triggered, monitoring for auto scaling events associated with the computing service resource group may continue.

Figure 6:
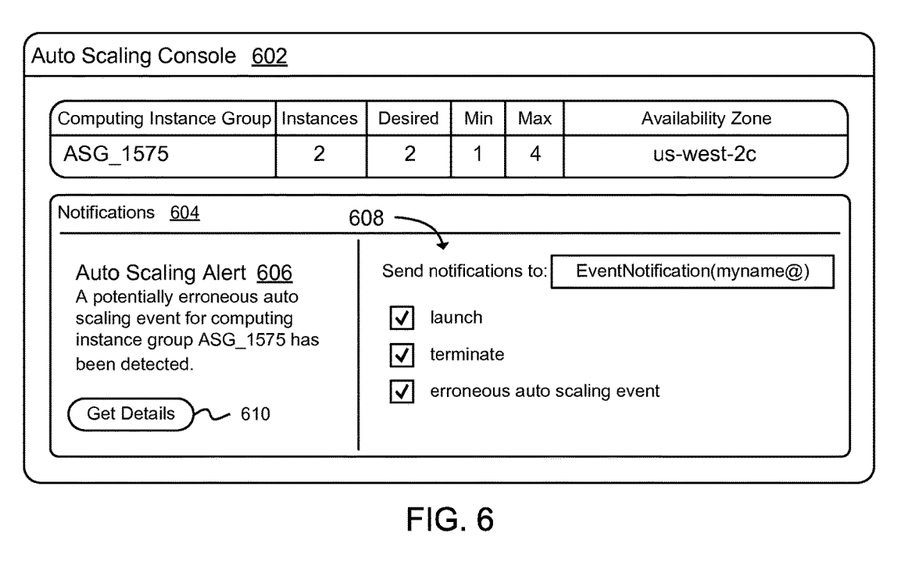
FIG. 6 is a diagram illustrating an example of an auto scaling command console used to view and manage notifications associated with auto scaling of computing service resource groups.

FIG. 6 is a diagram that illustrates an example of an auto scaling command console 602 that provides customers of a computing service provider a user interface to view and manage the customers' computing service resource groups. In one example, the auto scaling command console 602 may include a notification panel 604 that may be used to provide a customer with auto scaling alerts 606. For example, after detecting an auto scaling event that has been classified as being potentially erroneous, an auto scaling alert 606 may be shown in the notification panel 604 alerting a customer to the potentially erroneous auto scaling event and identifying a computing service resource group (e.g., a computing instance group) associated with the auto scaling event.

In one example, a control 610 (e.g., a button, link, or the like) included in the notification panel 604 may allow a customer to obtain specific information associated with the auto scaling event, such as any configuration events and related parameters that may have triggered the auto scaling event and metrics for the customer's computing service resource group at the time the auto scaling event was triggered.

As illustrated, the notification panel 604 may include notification settings 608 that may be configured by a customer. Included in the notification settings 608 may be an option to send the customer notifications associated with erroneous auto scaling events. For example, a customer may be sent an electronic message via email, SMS, MMS, or the like when a potential erroneous auto scaling event is detected.

Figure 7:
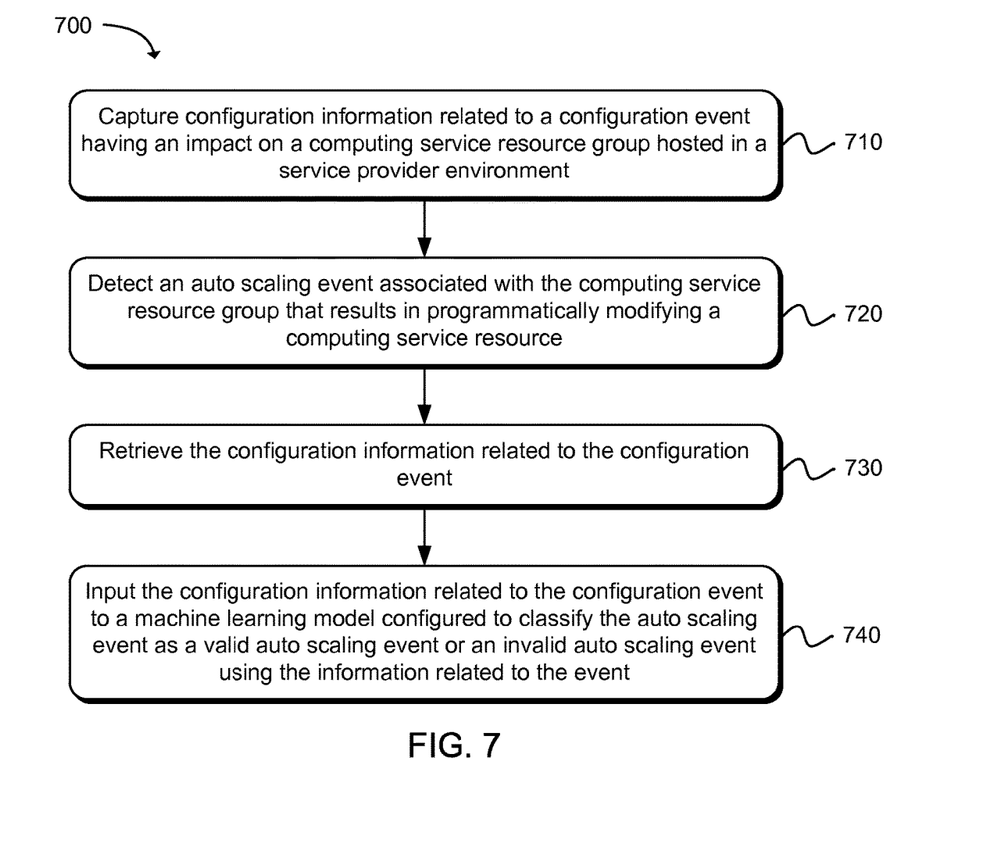
FIG. 7 is a flow diagram that illustrates an example method for classifying an auto scaling event using machine learning to determine whether the auto scaling event was erroneously activated.

FIG. 7 is a flow diagram illustrating an example of a method 700 for classifying an auto scaling event using machine learning to determine whether the auto scaling event was erroneously triggered. Starting in block 710, information related to a configuration event having an impact on a computing service resource group hosted in a service provider environment may be captured. The information may be stored so that the information may be retrieved in the event that an auto scaling event associated with the computing service resource is detected.

As in block 720, an auto scaling event associated with the computing service resource group that results in programmatically modifying a computing service resource may be detected. After detecting the auto scaling event, as in block 730, the information related to the configuration event may be retrieved. In one example, the auto scaling event may be analyzed to determine a trigger of the auto scaling event and data related to the trigger of the auto scaling event may be identified and a feature vector may be constructed using the data related to the trigger of the auto scaling event, as well as the information related to the configuration event.

As in block 740, the information related to the configuration event may be input to a machine learning model configured to classify the auto scaling event as a valid auto scaling event or an invalid auto scaling event using the information related to the event. In one example, the feature vector constructed above using the data related to the trigger of the auto scaling event and the information related to the configuration event may be input to the machine learning model.

The machine learning model may output a classification for the auto scaling event. In one example, a customer notification stating that the auto scaling event is a potentially invalid auto scaling event may be generated as a result of the machine learning model classifying the auto scaling event as invalid and the customer notification may be electronically sent to a customer associated with the computing service resource configuration. In another example, auto scaling of the computing service resource group may be programmatically overridden as a result of the machine learning model classifying the auto scaling event as potentially invalid, whereupon the state of the computing service resource group may be rolled back to a state that existed prior to the auto scaling event.

Figure 8:
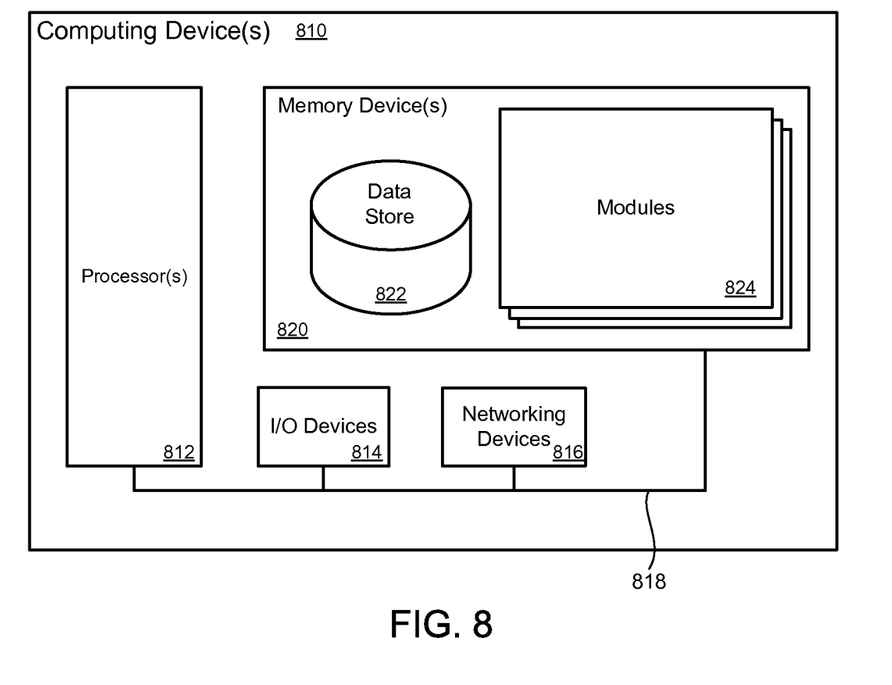
FIG. 8 is block diagram illustrating an example of a computing device that may be used to execute a method for classifying an auto scaling event as erroneously activated or legitimately activated.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 and services that are executable by the processor(s) 812 and data for the modules 824. In one example, the memory device 820 may include a configuration event collection service and an auto scaling classification service having an event monitoring module, a machine learning classifier, and a customer notification module. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local communication interface 818 may be used as a network to facilitate communication between any of the multiple processors and multiple memories. The local communication interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
   identify an occurrence of a first configuration event having an impact on capacity of a configuration of computing service resources hosted in a service provider environment;
   detect an occurrence of an auto scaling event that results in a change in capacity of the computing service resources instantiating or terminating a computing service resource that is respectively added to or removed from the configuration of computing service resources;
   identify an occurrence of a second configuration event associated with the auto scaling event that indicates that the auto scaling event that results in the change is invalid due to the auto scaling event being at least one of: erroneously triggered, rescinded, or additionally changed;
   obtain feature information related to the first configuration event and the second configuration event; and
   configure a machine learning model to classify the auto scaling event as invalid due to the auto scaling event being at least one of: erroneously triggered, rescinded or additionally changed using the feature information related to the first configuration event and the second configuration event.

2. A non-transitory machine readable storage medium as in claim 1, wherein the instructions that when executed by the processor identify the first configuration event as meeting an event boundary condition.

3. A non-transitory machine readable storage medium as in claim 1, wherein the instructions that when executed by the processor identify the first configuration event as being classified as an event that starts monitoring for the auto scaling event.

4. A computer implemented method, comprising:
   receiving configuration information related to a configuration event having an impact on a computing service resource group hosted in a service provider environment, using a processor;
   detecting an auto scaling event associated with the computing service resource group, wherein the auto scaling event is configured to add or remove a capacity of the computing service resource group, using a processor;
   retrieving the configuration information related to the configuration event, using the processor; and
   inputting the configuration information related to the configuration event into a machine learning model configured to classify the auto scaling event as an invalid auto scaling event, wherein classifying is based at least in part on the configuration information related to the configuration event matching a model that indicates that the auto scaling event is at least one of: erroneously triggered, rescinded, or additionally changed, using the processor.

5. A method as in claim 4, further comprising identifying a time boundary for analyzing configuration events that have had an impact on the computing service resource group.

6. A method as in claim 4, wherein retrieving the configuration information related to the configuration event further comprises retrieving the configuration information received within a time boundary.

7. A method as in claim 4, further comprising:
   identifying trigger information related to a trigger of the auto scaling event; and
   constructing a feature vector using the trigger information related to the trigger of the auto scaling event and the configuration information related to the configuration event.

8. A method as in claim 7, wherein inputting the information related to the configuration event to the machine learning model further comprises inputting the feature vector to the machine learning model.

9. A method as in claim 7, further comprising applying a weighting to a feature included in the feature vector, the weighting associated with a validity of the auto scaling event.

10. A method as in claim 4, further comprising training the machine learning model to classify the auto scaling event using a historical data set.

11. A method as in claim 4, further comprising training the machine learning model using supervised learning to identify a pattern of events having an impact on the computing service resource group that result in an operational error that triggers the auto scaling event.

12. A method as in claim 11, wherein training the machine learning model using supervised learning to identify the pattern of events further comprises training the machine learning model to identify a pattern of events associated with a customer overriding auto scaling of the computing service resource group.

13. A method as in claim 4, further comprising:
   identifying computing service resource groups hosted in the service provider environment that are similar to the computing service resource group; and
   constructing the machine learning model using historical training data obtained from other computing service resource groups that are similar to the computing service resource group.

14. A method as in claim 4, wherein the auto scaling event further comprises an event that triggers auto scaling of the computing service resource group;
   generating a notification prior to modifying a computing service resource that indicates the auto scaling event is an invalid auto scaling event; and
   sending the notification to a customer associated with the computing service resource configuration.

15. A method as in claim 4, wherein the auto scaling event further comprises an event that is expected to trigger auto scaling of the computing service resource group;
   generating a notification stating that auto scaling is likely to be triggered and that the auto scaling event is invalid; and
   sending the notification to a customer associated with the computing service resource configuration.

16. A method as in claim 4, further comprising overriding auto scaling of the computing service resource group as a result of the machine learning model classifying the auto scaling event as invalid.

17. A system comprising:
   a processor; and
   a memory device including instructions that, when executed by the processor, cause the system to:
   identify an occurrence of a configuration event having an impact on a computing service resource group hosted in a service provider environment;
   receive configuration information related to the occurrence of the configuration event having the impact on the computing service resource group;
   detect an auto scaling event associated with the computing service resource group that is associated with adding or removing a capacity of the computing service resource group;
   retrieve the configuration information related to the configuration event received at a time that falls within a time boundary for analyzing configuration events;
   determining that the auto scaling event is an invalid auto scaling event due to being at least one of: erroneously triggered, rescinded or additionally changed based at least in part on the configuration information; and
   generating a notification indicating that the auto scaling event is an invalid auto scaling event.

18. A system as in claim 17, wherein the memory device includes instructions that, when executed by the processor, causes the system to:
   identify computing service resource group information related to a trigger of the auto scaling event;
   analyze the trigger information related to the trigger of the auto scaling event and the configuration information related to the configuration; and
   classify the auto scaling event according to the analysis.

19. A system as in claim 17, wherein the memory device includes instructions that, when executed by the processor, causes the system to display the notification on a user interface that indicates that the auto scaling event is an invalid auto scaling event.

20. A system as in claim 17, wherein the memory device includes instructions that, when executed by the processor, causes the system to send a push message to a customer indicating that the auto scaling event is an invalid auto scaling event.

* * * * *